United States Patent [19]

Bleiman et al.

[11] 4,248,661

[45] Feb. 3, 1981

[54] LABEL STRIPPING APPARATUS

[75] Inventors: Arnold M. Bleiman, Yeadon; Gordon A. Russell, Strafford, both of Pa.

[73] Assignee: Suntech, Inc., Philadelphia, Pa.

[21] Appl. No.: 73,332

[22] Filed: Sep. 6, 1979

Related U.S. Application Data

[62] Division of Ser. No. 854,924, Nov. 25, 1977.

[51] Int. Cl.$^3$ .............................................. B32B 35/00

[52] U.S. Cl. .................................. 156/584; 15/93 R; 15/104.04; 83/861; 156/98; 156/248; 156/249; 156/344

[58] Field of Search ............... 156/344, 584, 248, 249, 156/94, 98, 155, 510, 529; 83/861, 857, 684, 695, 98, 165, 168, 171; 144/219; 134/6, 104; 15/93 R, 236 A, 104.04; 30/172, 301, 316

[56] References Cited

U.S. PATENT DOCUMENTS

| | | | |
|---|---|---|---|
| 2,165,394 | 7/1939 | Lyness | 83/684 |
| 2,855,707 | 10/1958 | Schor | 156/344 X |
| 3,292,257 | 12/1966 | Popeil | 30/301 |
| 3,587,377 | 6/1971 | Olson et al. | 83/695 X |
| 3,920,472 | 11/1975 | Vinson | 134/6 |
| 4,013,497 | 3/1977 | Wolf | 156/344 X |

*Primary Examiner*—William A. Powell
*Assistant Examiner*—Thomas Bokan
*Attorney, Agent, or Firm*—J. Edward Hess; Donald R. Johnson; Anthony Potts, Jr.

[57] ABSTRACT

During the labeling of a vial, mislabeling can occur. The unwanted label is cleanly and economically removed by forcing the vial through a novel collet-cutter. The cutter has at least two cutting edges and two slots. The slots permit expansion of the diameter of the cutting edges during the passage of a vial. At least one of the edges of the slots is outwardly sharpened. Further, its cutting edges are at an angle to the incoming vial and have an internal diameter whereby the label is removed completely and cleanly when the vial is forced through the cutter.

7 Claims, 8 Drawing Figures

Fig. I.
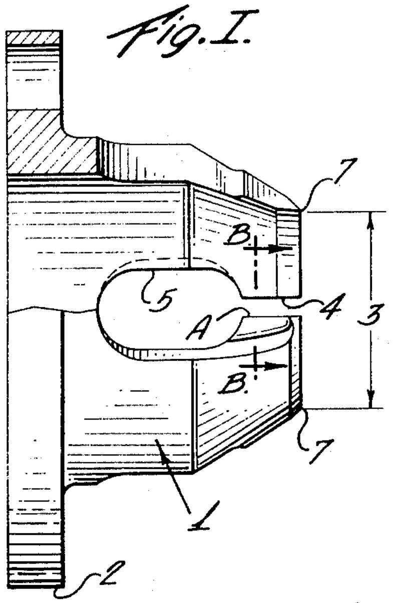
Fig. II.
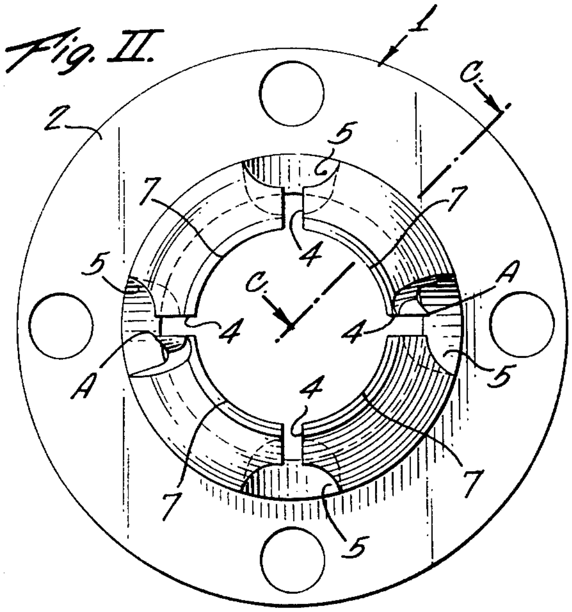
Fig. B.
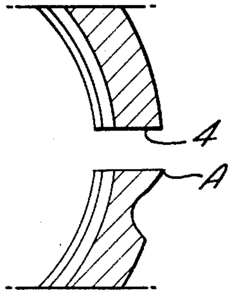
Fig. III.
(CONVENTIONAL)
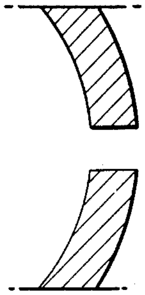
Fig. C.
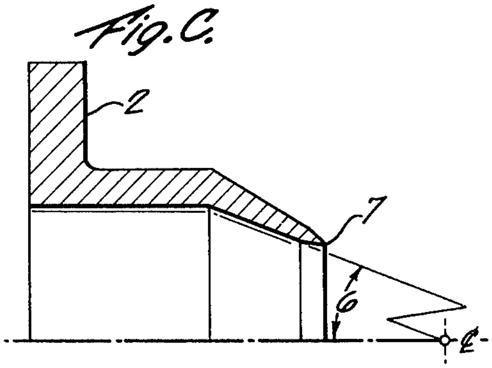
Fig. IV.
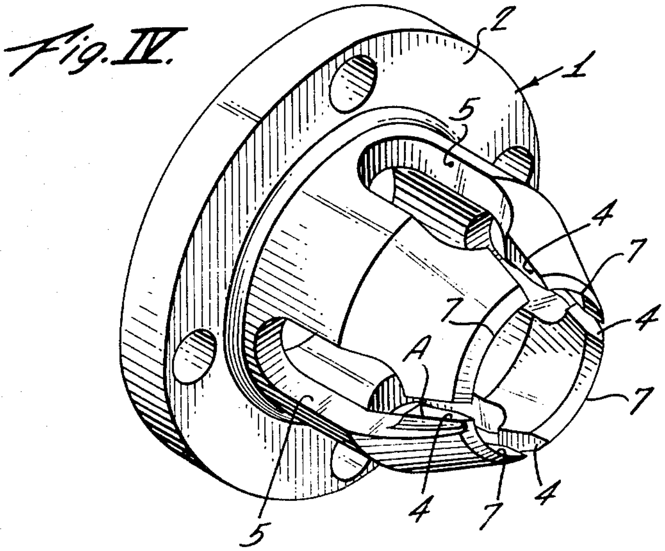

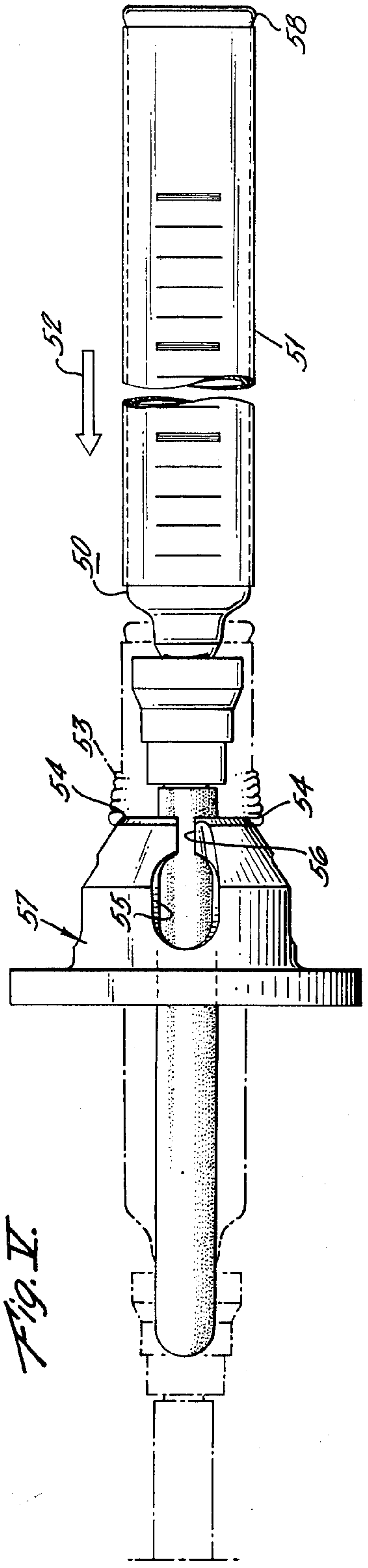
Fig. V.
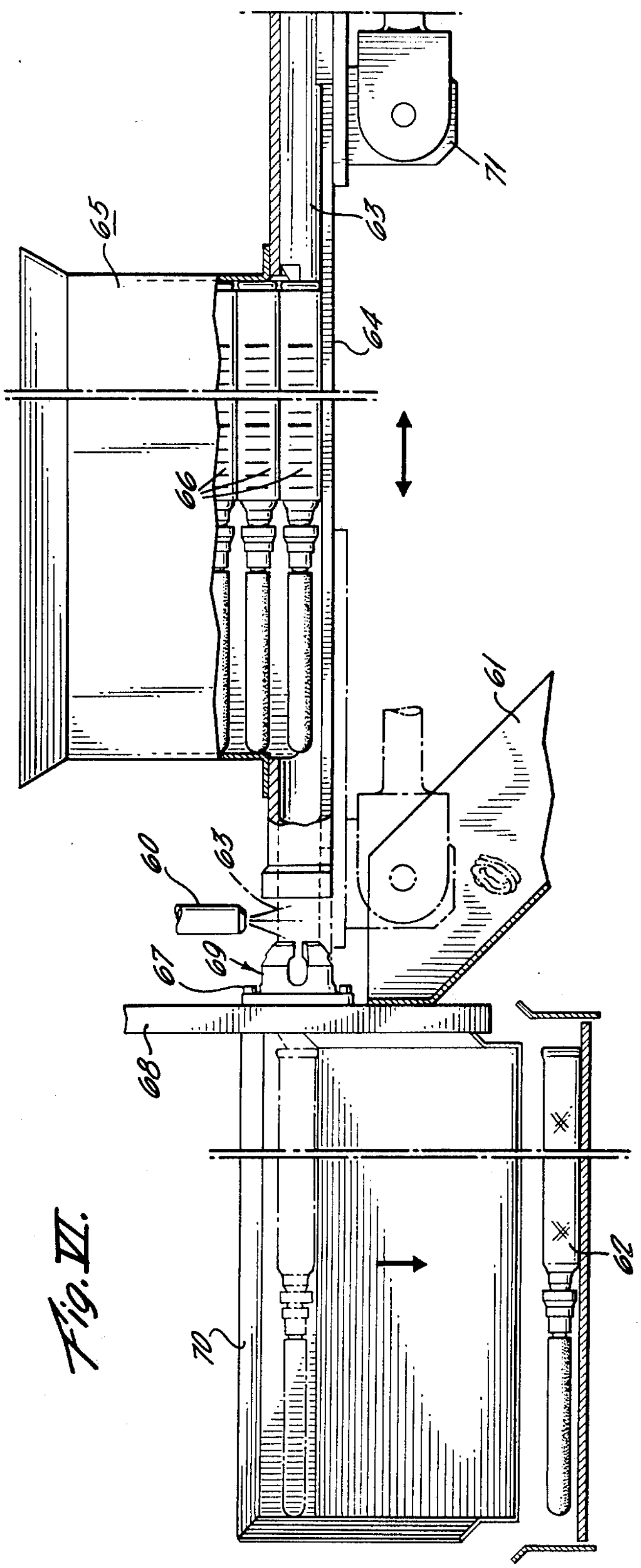
Fig. VI.

LABEL STRIPPING APPARATUS

This is a division of application Ser. No. 854,924, filed Nov. 25, 1977.

BACKGROUND OF THE INVENTION

Generally, a vial is labeled prior to its use. However, sometimes the vial is mislabeled, i.e., the wrong label is attached to the vial, or more than one label is attached and cannot be read, or the label is wrinkled in some fashion, or some other defect occurs. In any event, the label needs to be removed. While the label can be removed manually, such effort is slow because generally the label is attached to the vial with an adhesive or via some other holding means. The manual effort is also tedious because the vial must be made relatively clean to insure that proper attachment is obtained during the subsequent relabeling step.

Further complicating the removal of the label is that often the vial is filled with a material. And if the material is e.g., a medical liquid, it cannot be exposed to heat which would spoil the liquid. Use of heat could prove advantageous in that if the temperature of the label were raised to about or above the melting point of the adhesive, if used, the label could be removed more easily. However, heat sometimes has the disadvantage of causing the label to become tacky, further complicating its removal.

Still further complicating the removal of the label is that often the contained material can have a relatively high economic value. Thus, care needs to be taken so as not to break the vial. In addition, often the material can be harmful in some manner and thus breakage could cause harm to the person manually removing the label.

Because of the necessary physical properties of the material that makes it useful as a label, the label is inherently difficult to remove cleanly. For example, the label is generally made of rather strong, tear resistant material such as a polyester film.

The foregoing problems have been overcome by the use of a novel collet-cutter described hereinafter along with the disclosed method and apparatus.

SUMMARY OF THE INVENTION

The method for removing the label from a mislabeled vial involves forcing the vial through a novel collet-cutter. The cutter has at least two cutting edges. The cutting edges of the cutter are at an angle to the incoming vial and the internal diameter of the cutting edges is such that it will remove completely and cleanly the label from a vial when it is forced through the cutter. The slots between the cutting edges permit sufficient expansion of the cutting edges during the passage of a vial. Also at least one edge of at least one slot is outwardly sharpened.

DRAWINGS

FIGS. I and II represent one embodiment of the novel collet-cutter. A side view, with a partial cutaway view is shown by FIG. I while FIG. II shows a front view of the collet-cutter.

FIG. C is a partial cross section of one of the cutting edges along lines C—C of FIG. II.

FIG. B, a partial cross section along lines B—B of FIG. I, is a detailed drawing of a particular portion, i.e., the sharpened edge of a slot, of the novel collet-cutter whereas FIG. II shows a slot without such sharpened edge.

FIG. IV is an isometric view of the cutter showing two sharpened edges which are opposite each other.

FIG. V represents one embodiment of the method of using the aforementioned cutter to delabel a mislabeled vial.

FIG. VI represents one embodiment of the apparatus used to remove a label from a mislabeled vial.

DESCRIPTION

In FIGS. I and II the collet-cutter 1 can be attached to holding means (not shown) by shoulder 2. In FIG. I the internal diameter 3 of the cutting edges of the cutter is such that it permits a labeled vial to pass through while removing completely and cleanly the label without damaging, e.g., without marring, the vial. While FIGS. I and II show four cutting edges 7, more can be used but at least two cutting edges are necessary. Also both Figures show two outwardly sharpened slots (A).

The collet-cutter in FIGS. I and II has four slots each consisting of a smaller slot 4 and a larger slot 5. The slots permit the internal diameter 3 of the cutting edges 7 of the collet cutter to expand sufficiently during the passage of a labeled vial. Expansion is necessary because the external diameters of all the vials are not exactly the same; some variation exists. Further, when the labeled vial is an ampul, the edge of one end is polished by a flame treatment which results in a diameter slightly different than the untreated portion of the ampul (shown in FIG. V 58). No particular configuration of the slots is necessary and in general the only requirements of the slots is that they permit the aforementioned expansion. Thus, other slot arrangements can be constructed to accomplish the expansion. Generally, the two or more slots will be at an equal distance circumference-wise from each other.

In FIG. C, which is a cutaway view along line C—C of FIG. II, angle 6 is the angle between the cutting edges 7 and the center line of the collet cutter. The angle is such that it removes completely and cleanly the label and does it without, e.g., marring the surface of the vial as it passes by the cutting edges.

FIGS B and III are detailed side view sections of the slots. In particular FIG. B shows a detailed cutaway of the cutting edge along line B—B of FIG. I; the cutting edge has an outwardly sharpened edge A in accordance with the invention. In contrast, FIG. III shows a side view of a portion of one of the smaller slots which does not have such a sharpened edge. The outwardly sharpened edge cuts the label which assists in the prevention of a buildup of the removed label around the cutting edge. If two or more slots are used and more than one sharpened edge is used the sharpened edges generally would be opposite each other. Use of two sharpened edges provides a backup in case one of the edges fails to cut.

FIG. IV is an isometric view of the collet cutter 1 of FIGS. I and II showing a cutter having four cutting edges 7 and two slots each having one sharpened edge A. The numbers in FIG. IV refer to the same numbered features of FIG. I and II. Only one sharpened edge can be seen in FIG. IV.

In FIG. V a vial 50 (shown as an ampul with a covered hypodermic needle) having a label 51 is aligned with the novel collet cutter 57, that is, when the center line of the vial is extended to the cutter, it also is the center line of the cutter. Means 52 moves the vial 50 forward towards the collet cutter. As the vial enters the cutter the diameter of the edges expands sufficiently to permit passage while still having the edges 54 remain pressing against the vial 50. The expansion is permitted by the continuous slots 55 and 56 (others not shown). In FIG. V the shown cutter has four slots. As the vial passes by the cutting edges the label 51 is removed from the vial and is shown as 53. One of the smaller slots 56 has an outwardly sharpened edge which slices sideways the sliding up label. This slicing assists in the prevention of a buildup of the removed label around the cutting edges. FIG. V also shows in dashed lines an ampul which has passed partially through the cutter. The ampul 50 is shown as having a flame polished lip 58.

Means 52 used to move the vial 50 forward can be performed by a manual operation or mechanical means (not shown). Other devices can be incorporated into the method. One such device would be removal means, (not shown), e.g., an air blast which removes any portions of the label collecting around the cutting edges or elsewhere.

FIG. VI represents a more general embodiment of the apparatus used to remove a label from a mislabeled ampul. The novel collet cutter 69 is shown attached to holding means 68 by fasteners 67. Fasteners 67 are such that the collet can move slightly to accommodate ampul (or vial) whose center line is not exactly in line with the center line of the collet. The ampuls 66, the vertical lines representing the measurement markings of the labels, are stacked one upon one and held in position by enclosure 65. Enclosure 65 can be made of metal as indicated or a transparent material such as plexiglas which permits one to visually check the number of ampuls (or vials) in the hopper. The ampul at the bottom of the stack is held in alignment with the cutter by guide surface 64. The function of guide surface 64 is to hold the ampul adjacent to the cutter and/or in alignment with the cutter. The ampul is forced through the cutter 69 by actuator 63, shown in a rest position, which can be operated manually or automatically by forcing means 71. Movement of the actuator 63 forward forces the lowermost ampul through the cutter 69, thereby removing the label. Actuator 63 is shown in load position by solid lines and in a fully extended position in dashed lines. Once through the cutter 69 the ampul is collected by collecting means 70, and, in this embodiment, gently rolls down the inclined slope of collecting means 70. The inclined slope can be padded. Ampul 62 has had the unwanted label removed completely and cleanly. The cleaned ampul 62 can be removed from the collecting means 70 manually or via mechanical removal means (not shown). Any scraps of the removed label which collect around the cutting edges of the cutter can be removed automatically by various techniques, e.g., an air blast means 60.

After actuator 63 has forced a mislabeled vial through the cutter 69 it is returned to a load position. During its trip to the load position the next vial within the enclosure 65 drops onto guide surface 64 and is ready to be forced through the cutter 69 by the forward movement of the actuator 63. The actuator 63 can be operated in a continuous manner or in some other suitable cycle, e.g., one sequence per push of a control button. The actuator can return by a spring return (not shown) or some other means.

Container 61 collects pieces of the removed label from the mislabeled vial. Air blast means 60 forces the removed label away from the cutter and into the container 61. The air blast 60 can be continuous, or operated manually, or timed to operate simultaneously with the operation of actuator 63.

The label can be made of numerous different materials, e.g., a plastic such as a polyester film or a cellulose such as paper, and attached to the vial. The label can be attached to the vial using an adhesive which could be either inorganic or organic. Included in the inorganic groups are soluble silicates, phosphate cements, and the like, while the organic group can be a natural material such as animal, vegetable or mineral, or a synthetic organic adhesive such as an elastomer-solvent cement or a thermoplastic resin, e.g., polyethylene, or a thermosetting resin, e.g., polyvinyl butyral. The label also can be of a material which is heat shrunk around vial and thus no adhesive per se is present.

The collet-cutter itself can be made of any material that can hold an edge and has the flexibility to expand sufficiently when the vial is forced past the cutting edges. Generally, a ferrous metal such as steel and the like can be used but alloys such as stainless steel are preferred. The cutter could also be plated to protect it from possible corrosion if a vial containing a corrosive material is accidently broken. Materials such as zinc, tin, gold, silver and the like could be used to plate the cutting edge and/or the entire cutter.

While a collet is generally considered as having a circular cross sectional area, no such limitation is intended herein. Thus, the collet could have a cross sectional area which can vary from a circular cross sectional area. An example of another cross sectional area is one which is elliptical.

The collet-cutter can be held in a relatively fixed position by various means such as clamps, bolts and nuts and the like. However, the means should be such that the cutter can accommodate vials which are slightly off centered. The shoulder of the cutter could be drilled to accommodate screws which would hold the cutter to holding means.

The cutting edges of the collet-cutter are at angle to an incoming vial which enables the edges to remove a label completely and cleanly. Thus, once the label is removed another label can be properly applied to the vial. The angle of the cutting edges of the collet-cutter is also such that the edges do not damage the external surface of the vial as the label is removed. Generally the angle can vary over a considerable range and be operable. The preferred angle range is between from about 15° to about 45° and is towards the incoming vial (its center line).

If the cutting is made of a heat conducting material such as metal then it lends itself to the use of heat. Thus, for example, the cutter could be made of a metal and the cutter is attached to metal holding means. The holding means are heated by, for example, an electric heating device; others are well known. Thus, the heat readily travels from the holding means to the shoulder of the cutter and thence to the cutting edges themselves. The elevated temperature of the cutting edges can be controlled so that it assists in the removal of the label. Thus for example, it could be at about or slightly above the melting point of the adhesive holding the label to the vial. Such heating is not always necessary, but, depending upon the type and amount of adhesive and composition of the label, can be advantageous. However, if the vial is filled with a material that is susceptible to damage by heat, the cutter cannot be heated to a temperature which will exceed the spoilage temperature of the material. This can be very important if the material is to be used in medical treatment.

While a vial is generally defined as a small vessel for a liquid, its use herein is not restricted to any particular size of vessel nor any particular end use for the vessel. Further the vial can be solid, i.e., not be hollow. Further, the vial can be filled with a material other than a liquid; for example, a solid, a powder or even a gas. The word "vial" can include a special kind of container; for example, an ampul, which can be attached to a hypodermic needle. As to shape generally the vial will be elongated, but need not be. Thus, for example, the diameter of the vial can be equal to the length of the vial.

The following examples illustrate further the invention and also provide comparative examples.

EXAMPLES

A collet-cutter having the dimensions disclosed hereinafter was used to obtain the data given in the accompanying Table. The cutter had four cutting edges (also four slots). The internal diameter (3 in FIG. I), of the cutting edges was 0.351 inches. The smaller slot (4 in FIG. I) was about 0.020 inches high (side view) and its length was about 0.125 inches (side view). The larger slot 5 was about 0.125 inches high (side view) and its length (side view) was about 0.25 inches. The overall length (side view) of the cutter (1 in FIG. I) was about 0.525 inches. The angle of the cutting edges to the incoming vial were as shown in the Table.

Also indicated in the Table is whether the cutter was heated, whether one of the smaller slots had an outwardly sharpened edge, and if so, how many such sharpened edges, and whether one of the cutting edges had an outwardly raised lip. This outwardly raised lip is referred to in the Table hereinafter as a "chip breaker". The function of the chip breaker was to prevent a rolling up label from forming a donut around the cutter. However, as reported, it did not function according to expectations.

The labeled and elongated vials used in the runs had an external diameter of 0.356 inches ± and had an overall length of about three inches. The label was a polyester film which was a very strong tear resistant material.

Runs 1, 2 and 3 were comparative runs and the removal of the polyester film label was unsatisfactory for the reasons shown. Run 4 was a satisfactory run along with runs 5 and 6. Run 7 demonstrates that a satisfactory result was obtained with one cutting edge. The data reported in the Table indicates that a cutter with cutting edges of 37° gave better results than a cutter with cutting edges of 35°; however, it should be noted that the differences are subjective.

TABLE

COMPARISON OF VARIOUS COLLET CUTTERS

| Run No. | Angle of Cutting Edge[(1)] | Did Smaller Slot[(2)] Have Cutting Edge and How Many? | Does the Cutter Have a Chipbreaker? | Was the Cutter Heated? | Results | Was the Result Satisfactory? |
|---|---|---|---|---|---|---|
| 1 | 20° | No | No | Yes | Label slid up the cutter without breaking | No |
| 2 | 30° | No | Yes | Yes | Label formed donut around cutting edges & plugged cutters | No |
| 3 | 35° | Yes (8) | No | No | Left 4 strips of label behind on vial | No |
| 4 | 35° | Yes (2) | No | No | Label removed cleanly & no plugging | Yes |
| 5 | 37° | Yes (2) | No | No | Label more cleanly removed than Run 3 | Yes |
| 6 | 40° | Yes (2) | No | No | About same as Run 5 | Yes |
| 7 | 30° | Yes (1) | No | No | Label removed | Yes |

(1) The Cutter in runs 1–5 were made of tool steel whereas in Run 6 it was made of stainless steel.
(2) See FIGS. I and II, A; FIG. B; FIG. IV. In runs 3–6, sharpened edges of the slots are on opposite slots.

The invention claimed is:

1. An apparatus for removing a label from a vial comprising:

(a) a guide surface which holds a labeled vial adjacent to and in alignment with a collet-cutter;

(b) a collet-cutter having at least two cutting edges, separated by slots of which at least one has at least one of its lengthwise edges outwardly sharpened, which cutting edges are at an angle to an incoming vial and which cutting edges have an internal diameter whereby the label is removed completely and cleanly from the vial when vial is forced through the cutter.

2. Apparatus according to claim 1 further comprising means for holding the collet-cutter.

3. Apparatus according to claim 2 further comprising means for forcing the vial through the cutter.

4. Apparatus according to claim 3 further comprising means for removing scraps of the removal label from the cutter.

5. Apparatus according to claim 4 further comprising collecting means for collecting the vials with the labels removed.

6. Apparatus according to claim 1 and additionally comprising means allowing the collet cutter to move slightly in relation to the vial to align the center line of the cutter with the center line of the vial.

7. Apparatus according to claim 1 wherein said collet cutter has a corrosion-resistant surface.

* * * * *